US008473919B2

(12) United States Patent
Cutler

(10) Patent No.: US 8,473,919 B2
(45) Date of Patent: Jun. 25, 2013

(54) SYSTEM AND METHOD FOR REPEATING PROGRAM FLOW FOR DEBUGGING AND TESTING

(75) Inventor: James Robert Cutler, Steubenville, OH (US)

(73) Assignee: CA, Inc., Islandia, NY (US)

( * ) Notice: Subject to any disclaimer, the term of this patent is extended or adjusted under 35 U.S.C. 154(b) by 1219 days.

(21) Appl. No.: 12/023,850

(22) Filed: Jan. 31, 2008

(65) Prior Publication Data

US 2009/0199161 A1     Aug. 6, 2009

(51) Int. Cl.
*G06F 9/44*     (2006.01)
(52) U.S. Cl.
USPC ............ 717/128; 717/124; 717/129; 717/130
(58) Field of Classification Search
None
See application file for complete search history.

(56) References Cited

U.S. PATENT DOCUMENTS

| | | | | |
|---|---|---|---|---|
| 6,182,243 | B1* | 1/2001 | Berthe et al. | 714/38.11 |
| 7,506,318 | B1* | 3/2009 | Lindo et al. | 717/130 |
| 7,647,584 | B2* | 1/2010 | Sluiman | 717/124 |
| 7,661,031 | B2* | 2/2010 | Birsan et al. | 714/38.1 |
| 7,900,198 | B2* | 3/2011 | Kasman | 717/158 |
| 7,958,486 | B2* | 6/2011 | Tsyganskiy et al. | 717/105 |
| 7,958,497 | B1* | 6/2011 | Lindo et al. | 717/128 |
| 8,079,019 | B2* | 12/2011 | Lindo et al. | 717/129 |
| 2002/0133807 | A1* | 9/2002 | Sluiman | 717/124 |
| 2005/0028145 | A1* | 2/2005 | Kang et al. | 717/128 |
| 2007/0234305 | A1* | 10/2007 | Mishra et al. | 717/128 |
| 2008/0016500 | A1* | 1/2008 | Hinkley et al. | 717/128 |
| 2008/0082967 | A1* | 4/2008 | Kasman | 717/124 |
| 2008/0141226 | A1* | 6/2008 | Girouard et al. | 717/128 |

OTHER PUBLICATIONS

Bogdan Korel, "Automated Software Test Data Generation", 1990 IEEE, pp. 870-879, <http://ieeexplore.ieee.org/stamp/stamp.jsp?tp=& arnumber=57624>.*
Jin-Cherng Lin et al., "Automatic test data generation for path testing using GAs", May 2000, Tatung University, Taiwan, pp. 47-64, <http://www.sciencedirect.com/science/article/pii/S0020025500000931#>.*
Peter Altenbernd, "On the False Path Problem in Hard Real-Time Programs", 1996 IEEE, pp. 102-107, <http://ieeexplore.ieee.org/stamp/stamp.jsp?tp=&arnumber=557827>.*
Thomas Ball et al., "The SLAM Project: Debugging System Software via Static Analysis", 2002 ACM, 3 pages, <http://dl.acm.org/citation.cfm?id=503274>.*
Marc Friedman et al., "Navigational Plans for Data Integration", 1999 AAAI, 7 pages, <http://www.aaai.org/Papers/AAAI/1999/AAAI99-010.pdf>.*
Koushik Sen et al., "CUTE and jCUTE: Concolic Unit Testing and Explicit Path Model-Checking Tools", 2006 CAV, pp. 419-423, <http://link.springer.com/chapter/10.1007%2F11817963_38?LI=true#page-1>.*

\* cited by examiner

*Primary Examiner* — Thuy Dao
*Assistant Examiner* — Cuong V Luu
(74) *Attorney, Agent, or Firm* — Baker Botts, LLP

(57) ABSTRACT

A method for repeating program flow for debugging and testing purposes comprises storing function call data in one or more files and retrieving the recorded data from the one or more files. The method further comprises using the recorded data to recreate an execution path of a program. Additionally, the method comprises analyzing the execution path to determine a source of an error in the program.

18 Claims, 1 Drawing Sheet

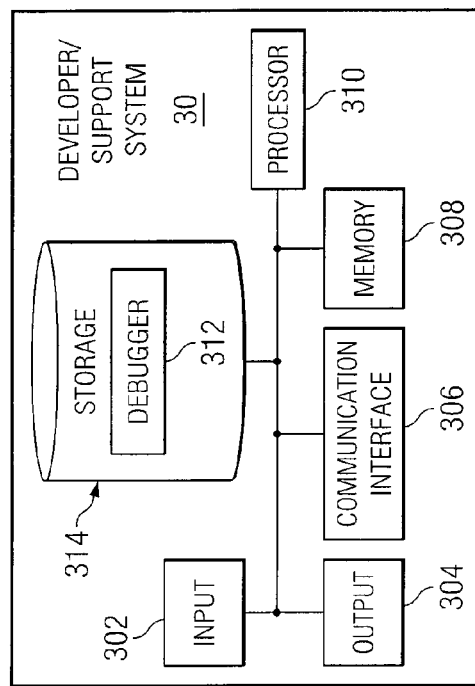
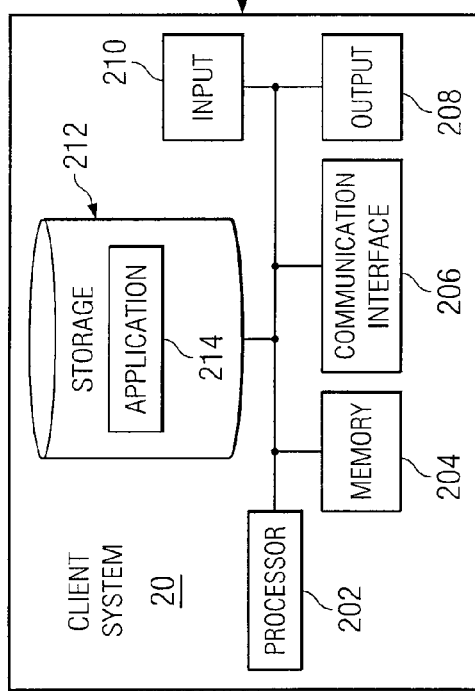
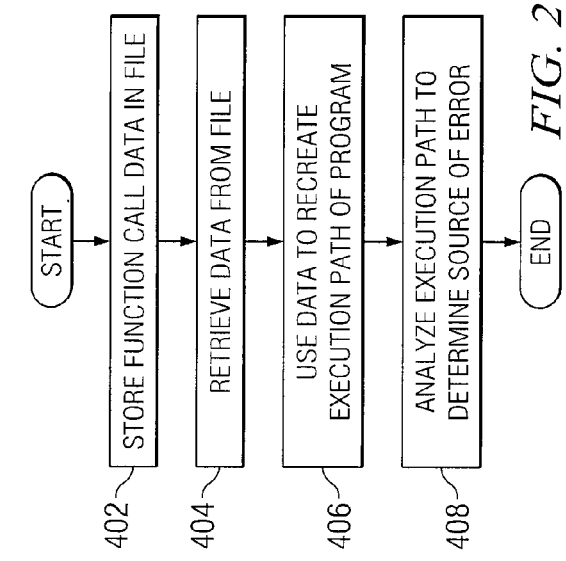
FIG. 1
FIG. 2

SYSTEM AND METHOD FOR REPEATING PROGRAM FLOW FOR DEBUGGING AND TESTING

TECHNICAL FIELD

The present disclosure relates generally to software, and more particularly to a system and method for repeating program flow for debugging and testing of software.

BACKGROUND

Effective software testing and debugging has become increasingly important as people become more reliant on computers for business and personal use. This increased reliance is due in large part to vast improvements in technology and computing power. However, these improvements are often the direct result of increasingly complex software, making it virtually impossible for developers to provide totally error-free programs to customers. Because of this problem, software developers often provide support technicians who receive error reports from customers and attempt to fix the underlying problems in the software code. This can be particularly challenging, as oftentimes the developer is unable to recreate the exact problem encountered by the customer, making it difficult to diagnose the source of the problem.

SUMMARY OF EXAMPLE EMBODIMENTS

The present disclosure is related to a method for repeating program flow for debugging and testing purposes. The teachings of the present disclosure allow software problems to be diagnosed in an efficient manner.

In accordance with a particular embodiment of the present disclosure, a method for repeating program flow for debugging and testing purposes comprises storing function call data in one or more files and retrieving the recorded data from the one or more files. The method further comprises using the recorded data to recreate an execution path of a program. Additionally, the method comprises analyzing the execution path to determine a source of an error in the program. More specifically, the storing of function call data may be automatically triggered when an exception is generated by a function call in the program.

In accordance with another aspect of the present invention, a system is disclosed. The system comprises an interface, a processor, and a storage device. The storage device embodies a program of instructions that are operable, when executed on the processor, to store function call data in one or more files and retrieve the function call data from the one or more files. The program of instructions is further operable to recreate an execution path of a program on a second computer using the function call data from the first computer and analyze the execution path in order to determine a source of an error in the program.

In accordance with another aspect of the present invention, logic encoded in a computer readable medium is disclosed. The logic is operable, when executed, to store function call data in one or more files and retrieve the function call data from the one or more files. The logic is further operable to recreate an execution path of a program using the function call data and analyze the execution path to determine a source of an error in the program. More specifically, the logic may be operable to automatically store function call data when an error is generated by a function call in the program and to recreate that function call.

Technical advantages of particular embodiments of the present disclosure include a method for repeating program flow. Thus, debugging may be substantially improved.

Further technical advantages of particular embodiments of the present disclosure include recreation of the same program environment experienced by the customer, using the customer's own input and output data.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which:

FIG. 1 is a schematic drawing illustrating a computer network configuration suitable for use within one aspect of the present invention; and FIG. 2 is a flow diagram illustrating a method for repeating program flow for debugging and testing purposes, according to one embodiment of the present disclosure.

DETAILED DESCRIPTION

Although software testing and debugging is performed before providing software packages to users, it is virtually impossible to catch and fix all errors in the software code. Therefore, software developers often provide support services to receive input from customers and fix reported problems. However, it can be difficult for a developer or support technician to recreate the exact same problem reported by a customer, making diagnosis of the source of the problem difficult. Existing methods include providing a support technician with dumps or log files. Dump files provide a point-in-time snapshot of the information that was in memory when an error occurred. Log files, on the other hand, are lists of actions that have occurred in a program. These approaches can help in testing and debugging, but are less than ideal.

In accordance with the teaching of the present disclosure, a method for repeating program flow includes a method that addresses the ability to recreate a customer execution path in a development environment using customer data. The object of this new method is to allow re-creation by a developer of a problem encountered by a user and allow more efficient diagnosis of the underlying problem using modern graphical and real-time debugging tools in place of reading dumps or analyzing logs.

According to one embodiment of the present disclosure, when the program is run by a customer, function call and return data is stored in one or more files. This stored data is then retrieved from these files and is used to recreate the program execution path which caused the error encountered by the customer, utilizing the same input and output used by the customer. The execution path can then be reproduced by the developer to more easily determine the source of an error in the program. According to one embodiment, this recording may be automatically triggered whenever an error is generated by a function call in the program.

FIG. 1 illustrates a system according to one embodiment of the present disclosure, generally designated by reference numeral 10. System 10 includes client system 20, developer/support system 30, and communications network 40.

According to the illustrated embodiment, client system 20 includes a processor 202, a memory device 204, a communication interface 206, an output device 208, an input device 210, and a storage device 212. Storage device 212 includes client application 214. In the illustrated embodiment, client application 214 resides in storage device 212. In other embodiments of the disclosure, client application 214 may reside in memory device 204, or any other suitable device operable to store and facilitate execution of client application 214.

Processor 202 may refer to any suitable device operable to execute instructions and manipulate data to perform operations for client system 20. Processor 202 may include, for example, any type of central processing unit (CPU).

Memory device 204 may refer to any suitable device operable to store and facilitate retrieval of data, and may comprise Random Access Memory (RAM), Read Only Memory (ROM), a magnetic drive, a Digital Video Disk (DVD) drive, removable media storage, any other suitable data storage medium, or a combination of any of the preceding.

Communication interface 206 may refer to any suitable device operable to receive input for client system 20, send output from client system 20, perform suitable processing of the input or output or both, communicate to other devices, or any combination of the preceding. Communication interface 206 may include appropriate hardware (e.g. modem, network interface card, etc.) and software, including protocol conversion and data processing capabilities, to communicate through a local area network (LAN), wide area network (WAN), or other communication system that allows client system 20 to communicate to other devices. Communication interface 206 may include one or more ports, conversion software, or both.

Output device 208 may refer to any suitable device operable for displaying information to a user. Output device 208 may include, for example, a video display, a printer, a plotter, or other suitable output device.

Input device 210 may refer to any suitable device operable to input, select, and/or manipulate various data and information. Input device 210 may include, for example, a keyboard, mouse, graphics tablet, joystick, light pen, microphone, scanner, or other suitable input device.

Storage device 212 may refer to any suitable device operable for storing data and instructions. Storage device 212 may include, for example, a magnetic disk, flash memory, optical disk, or other suitable data storage device.

Client application 214 may include any form of software, including software provided by a software developer. Such software may include, but is not limited to software for performance management, database management, security management, or information technology (IT) management. In one particular embodiment, client application 214 may be written using the C# language. According to alternative embodiments, client application 214 may be written in C++, Java, Visual Basic, or virtually any other programming language that supports the writing of data in binary form to a disk.

According to one embodiment, the method of the present invention is implemented through the insertion of a rule or pattern into the code of client application 214 before compilation. This rule may take various forms, including changes to the standard entry and exit code of functions, special logic added at the entry and exit points of functions, or intermediary (wrapping) functions. In an alternative embodiment, the rule could be implemented using compiler-generated entry and exit code. In some embodiments, these rules are inserted into both release and debug versions of software code. Additionally, a single rule may be utilized for multiple different customer applications and software packages. Alternatively, a customized rule may be written for each individual customer application. For newer versions of software, a developer may wish to insert these rules before client application 214 is made available to customers. However, for older software that has been released without these rules, a software developer may provide the modified code for download as a patch.

Once inserted, the rules may perform various tasks that assist in the performance of the disclosed methods. In one embodiment, a script will begin by parsing all of the code. The script will then search the parsed code, looking for all functions and all their call, reference, and return data. This data includes all the data that is necessary to run each function on support system 30. The function call data may include, but is not limited to all data passed to a function, all data returned from a function, and all data that the function references.

In one embodiment, for each function the script finds, the script injects the function with additional code at its entry and exit points. This injected code performs the logic necessary to record and replay the original function's inputs and outputs. In alternative embodiments, for each function the script finds, it may rename the original function and create a new function with the original name. The new function contains the code necessary to record and replay the original function's inputs and outputs and to call the original function. This new function may be referred to as a "wrapping" or "injected" function and the original function may be referred to as a "wrapped" function. Thus, when the program is run, and a function is called, the wrapping function will actually be called which will provide the record and replay logic as well as call the wrapped function.

When this wrapping function is called, it performs various steps. First, the wrapping function will determine whether the current environment requires recording or replay. Recording occurs in the customer environment and replay occurs in the development or support environments.

In the recording environment, the wrapping function records the function's inputs and environment (i.e., values referenced by the function but not specifically passed to it as a parameter). The wrapping function then calls the wrapped function. Upon return of control from the wrapped function, the wrapping function records its outputs and changes it made to the environment.

In the replay environment, the wrapping function ignores the input parameters passed to it by its caller and the current environment. Instead it retrieves the input and environment values passed to the wrapped function during the recording session. It sets up the environment to be that which was active at the time of the recording and then calls the wrapped function with the values passed to it during the recording. Upon return from the wrapped function it changes the environment to be that which was found during recording and changes the output parameters to the values returned by the wrapped function during recording.

As an example of the process, a simple function may be created to increment a counter and return the number of seconds since midnight. The function takes a single number as an input which is the amount to increment the counter. It returns a single number: the number of seconds since midnight. Its environment consists of a single number: the counter. During recording, the wrapping function records the value of the counter (i.e., the environment) and the value of the increment input parameter. It then calls the wrapped function. On return of the wrapped function, it records the output value: the number of seconds since midnight. Let us say that during recording, the counter had the value of 12, the increment value was 13, and there were 10,000 seconds since midnight. During replay, because the program is running on a different computer at a different time, the counter may have a value of 100, the increment value may be 50, and it may by 20,000 seconds since midnight. However, when the wrapping function determines that a replay is being done, it will force the value of the counter to be 12 before calling the wrapped function. Also, when calling the wrapped function, it will pass it 13 as the increment amount instead of the 50 that was passed to it by the developer's environment. Upon return of the wrapped function, it will set the return value to 10,000 and return that to the calling function instead of the actual value on the developer's computer.

The overhead of always recording functions is expensive. For this reason, the wrapping function generally only records when an error is detected in the wrapped function. If the wrapped function performs normally, and does not generate any errors, no recording will be performed. However, if an error is generated by the function call, the injected code in the wrapping function will then initiate recording. Such an error may be in the form of an exception or any other condition that indicates an error in the normal flow of the program's execution. Recording in this manner is problematic in that the wrapped function may have changed the values of the input parameters or environment before the wrapping function records them. In one embodiment, the wrapping function records the input parameters and environment to RAM before calling the wrapped function and then transfers those values to disk if it detects an error in the wrapped function. In one embodiment, the injected code checks configuration files on entry to see if recording has been specifically requested for the wrapped function and, if so, records without regard to whether the wrapped function produces an error.

In the customer environment, the injected code should be able to automatically switch from a monitoring mode into a recording mode and back. This may be accomplished by various methods. In one particular embodiment, this may be accomplished through the use of exception handling within the program. Exception handling may include a catch routine that detects the generation of exceptions, and will automatically initiate a recording mode. Once the code is in recording mode, it will write the function call and return data to one or more files. In one particular embodiment, this data comprises the user inputs and reference parameters passed to the function call. In other embodiments, the code may record various other data that will be helpful in recreating flow of the program leading up to the generated exception. In certain embodiments of the present disclosure, the recording of the data may specifically be accomplished through serialization or any other method of writing data to a disk in a retrievable format.

In one embodiment of the present disclosure, this recording mode may continue while the rest of the program is run. In alternative embodiments, the recording mode will continue until the program reaches a next high-level function after the generation of an exception, at which point it will stop recording data. Other recording sessions can still be generated in the program if subsequent errors are generated.

In alternative embodiments, the recording mode need not be triggered by the generation of an exception. In certain embodiments, a user may manually set application 214 to run in record mode. In certain embodiments, if logging techniques are also used in application 214, certain logging levels can be used to automatically initiate a recording mode. In one particular embodiment, this can be accomplished through use of the log 4net tool.

In the illustrated embodiment, client system 20 and support system 30 are connected via communications network 40. Communications network 40 could include, but is not limited to a LAN, a WAN, or any other network that would allow communication between client system 20 and support system 30.

Once all the necessary data has been recorded at client system 20, the one or more files must then be conveyed to support system 30. This can be accomplished through various embodiments of the present invention. In one embodiment, the one or more files may be automatically transmitted to a support technician. This would require that both the user and the support technician be connected to some sort of a network, as illustrated by FIG. 1. In one instance, the injected code could include code that would automatically send the one or more files over the network to a support technician. In some embodiments, the user may receive a prompt, asking the user whether he or she wants to send an error report concerning an error in the program. If the user responds affirmatively, the one or more files will then be sent. In other embodiments, the one or more files will be sent automatically, without any prompting of the user.

In other embodiments, the user may have to take affirmative steps to report a problem and provide the one or more files to a support technician. This may include sending the one or more files as an attachment in an email. In another embodiment, support system 30 may provide a file transfer protocol (FTP) site for users to upload the one or more recorded files. Alternatively, if the user does not have access to email or a network connection, the user may actually save the one or more files to some physical recording medium, and then mail that item to a support center. The recording medium may include, but is not limited to floppy disks, CD-ROM, DVD-ROM, flash memory recording device, or some other removable data storage device.

According to the illustrated embodiment, support system 30 includes a processor 310, a memory device 308, a communication interface 306, an output device 304, an input device 302, and a storage device 314. Storage device 314 includes support application 312. In the illustrated embodiment, support application 312 resides in storage device 314. In other embodiments of the disclosure, support application 312 may reside in memory device 308, or any other suitable device operable to store and facilitate execution of developer application 312. Processor 310 may refer to any suitable device operable to execute instructions and manipulate data to perform operations for support system 30. Processor 310 may include, for example, any type of central processing unit (CPU).

Memory device 308 may refer to any suitable device operable to store and facilitate retrieval of data, and may comprise Random Access Memory (RAM), Read Only Memory (ROM), a magnetic drive, a Digital Video Disk (DVD) drive, removable media storage, any other suitable data storage medium, or a combination of any of the preceding.

Communication interface 306 may refer to any suitable device operable to receive input for support system 30, send output from support system 30, perform suitable processing of the input or output or both, communicate to other devices, or any combination of the preceding. Communication interface 306 may include appropriate hardware (e.g. modem, network interface card, etc.) and software, including protocol conversion and data processing capabilities, to communicate through a LAN, WAN, or other communication system that allows support system 30 to communicate to other devices. Communication interface 306 may include one or more ports, conversion software, or both.

Output device 304 may refer to any suitable device operable for displaying information to a user. Output device 304 may include, for example, a video display, a printer, a plotter, or other suitable output device.

Input device 302 may refer to any suitable device operable to input, select, and/or manipulate various data and information. Input device 302 may include, for example, a keyboard, mouse, graphics tablet, joystick, light pen, microphone, scanner, or other suitable input device.

Storage device 314 may refer to any suitable device operable for storing data and instructions. Storage device 314 may include, for example, a magnetic disk, flash memory, optical disk, or other suitable data storage device.

Support application 312 includes any program used to test a find defects in another computer program. In one particular embodiment, support application 312 may comprise a debugger. This debugger may be constructed specifically for use with client application 214. In alternative embodiments, the debugger may be capable of debugging multiple different programs, including client application 214.

Once an error has occurred and data has been recorded and received by a support technician, the support technician may use support application 312 to determine what actually caused the problem. This may take one of several different forms.

In one embodiment of the present invention, a support technician may identify from the one or more files which program the files correspond to. After doing so, the support technician will then open the appropriate program code. In some embodiments, this will involve opening the debug version of the program code using a debugger.

In another embodiment of the present invention, a support technician may open the one or more files first. In this embodiment, the files may include code that will automatically open the appropriate corresponding program code. In some embodiments, this will involve opening the debug version of the program code using a debugger.

Once the appropriate code is opened, the next step to recreating program flow occurs through triggering of a replay mode. In some embodiments this replay mode may automatically be triggered by the receipt of the one or more files from a user, indicating the existence of an error. The support technician's application 312 may be configured so that whenever one of these files is opened, application 312 automatically determines the highest level function that may have caused the error, and calls that function in replay mode. Alternatively, the files themselves may have instructions that turn the replay mode on. In some embodiments, the replay mode is managed manually by the support technician. Thus, when the technician is running problem-solving operations, such as debugging, the technician may manually switch the code to replay mode in an attempt to recreate the flow of the program that was experienced by the user.

Once in replay mode, the debugger will walk through the code, step-by-step. Similar to the release version of the code operated by the user, the debug version of the code will also feature the wrapping functions or injected code. Thus, when the debugger gets to a function call, it will open the wrapping function.

When this wrapping function is called, it will retrieve function call and return data from the one or more files. In one embodiment, this data may include user input and reference parameters. In yet another embodiment, the data recorded in the one or more files may be in serialized form. If this is the case, the injected code of the wrapping function will then deserialize the data.

Once the data is retrieved from the one or more files, it is passed to the original, "wrapped" function. In this manner, the support technician is able to walk through the program, step-by-step. The presence of the injected code and the one or more files allows the support technician to pass the same user input and reference parameters to the function calls. By doing this, the technician is able to accurately recreate the program flow experienced by the user.

After the support technician has recreated the program flow, graphical or real-time debugging or problem solving methods may be employed to determine the source of one or more errors in the code.

Once the source of the one or more errors in the code is determined, the support technician may take several different steps to remedy the situation. In one embodiment, the support technician may check to see if any software patches currently exist that may address the problem. If such a patch is found, the software technician may direct the user to install the patch. This instruction may be directed to the user in several different manners, including but not limited to a phone conversation, email correspondence, or an online chat support session. In an alternative embodiment, the support technician may apply the patch to the code, and then test the effectiveness of the patch by re-running the code using the recorded data. If the patch is effective, then the support technician may direct the user to install the patch. If the patch is not effective, the support technician may then take additional steps to solve the problem, including creating a new patch. As before, the support technician can direct the user to install this patch. Alternatively, the support technician may test the effectiveness of the new patch using the recorded data prior to instructing the user to install the patch.

FIG. 2 is a flow diagram illustrating a method for repeating program flow for debugging and testing purposes, according to one embodiment of the present disclosure. The method begins at step 402, where function call and return data is stored in one or more files. At step 404, the stored function call is retrieved from the one or more files. At step 406, the retrieved function call and return data is used to recreate an execution path of a program. Finally, at step 408, the execution path is analyzed to determine a source of error in the program.

It should be understood that some of the steps illustrated in FIG. 2 may be combined, modified, or deleted where appropriate, and additional steps may also be added to the flow diagram.

In addition to the advantages enumerated above, various embodiments of the present disclosure provide other benefits. Unlike dumps, which have traditionally been relied upon in error diagnosis, the recorded data provided by the present disclosure allows a support technician to actually run the code in a debugger. Additionally, certain embodiments of the present disclosure may allow a support technician to effectively test and debug obfuscated code. Also, as it is implemented, certain embodiments of the present disclosure allow for more effective testing and debugging, while having minimal detrimental effect on the overall performance of client application 214. Various other advantages may be readily apparent to one having skill in the art.

Although the present invention has been described in detail, it should understood that various changes, substitutions, and alterations can be made without departing from the spirit and scope of the invention as defined by the appended claims.

What is claimed is:

1. A method executable by a processor, comprising:
    storing function call data in one or more files by serializing the function call data;
    retrieving the stored function call data from the one or more files by deserializing the function call data;

recreating an execution path of a program using the function call data; and analyzing the execution path to determine a source of an error in the program, and parsing the program with a script to identify a function associated with the function call data and, in response to identifying the function, inserting code at an entry point and at an exit point of the function to enable record and replay of inputs and outputs of the function.

2. The method of claim 1, wherein storing function call data is automatically triggered when an error is generated by a function call in the program.

3. The method of claim 1, wherein the function call data comprises function call inputs and reference parameters.

4. The method of claim 1, wherein analyzing the execution path comprises using a debugger.

5. The method of claim 1, further comprising altering code in the program to correct the error in the program.

6. The method of claim 5, further comprising testing the altered code using the recorded data.

7. A system, comprising:
an interface;
a processor;
a storage device embodying a program of instructions operable, when executed on the processor to:
store function call data in one or more files by serializing the function call data;
retrieve the stored function call data from the one or more files by deserializing the function call data;
recreate an execution path of a program using the function call data; and
analyze the execution path to determine a source of an error in the program, and
parse the program with a script to identify a function associated with the function call data and, in response to identifying the function, insert code at an entry point and at an exit point of the function to enable record and replay of inputs and outputs of the function.

8. The system of claim 7, wherein the program of instructions is further operable to automatically store function call data when an error is generated by a function call in the program.

9. The system of claim 7, wherein the function call data comprises function call inputs and reference parameters.

10. The system of claim 7, wherein the program of instructions is further operable to analyze the execution path using a debugger.

11. The system of claim 7, wherein the program of instructions is further operable to alter code in the program to correct the error in the program.

12. The method of claim 11, wherein the program of instructions is further operable to test the altered code using the recorded data.

13. Logic encoded in a non-transitory computer readable medium and operable, when executed on a processor to:
store function call data in one or more files by serializing the function call data;
retrieve the stored function call data from the one or more files by deserializing the function call data;
recreate an execution path of a program using the function call data; and
analyze the execution path to determine a source of an error in the program, and
parse the program with a script to identify a function associated with the function call data and, in response to identifying the function, insert code at an entry point and at an exit point of the function to enable record and replay of inputs and outputs of the function.

14. The logic of claim 13, wherein the logic is further operable to automatically store function call data when an error is generated by a function call in the program.

15. The logic of claim 13, wherein the function call data comprises function call inputs and reference parameters.

16. The logic of claim 13, wherein analyzing the execution path comprises using a debugger.

17. The logic of claim 13, wherein the logic is further operable to alter code in the program to correct the error in the program.

18. The logic of claim 17, the logic is further operable to test the altered code using the recorded data.

* * * * *